US007206971B2

(12) United States Patent
Zeller et al.

(10) Patent No.: US 7,206,971 B2
(45) Date of Patent: Apr. 17, 2007

(54) SELECTABLE AND UPDATABLE COMPUTER BOOT MEMORY

(75) Inventors: Jeremy R. Zeller, Wichita, KS (US); David E. Hoyer, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 550 days.

(21) Appl. No.: 10/409,750

(22) Filed: Apr. 7, 2003

(65) Prior Publication Data

US 2004/0199825 A1      Oct. 7, 2004

(51) Int. Cl.
*G06F 11/00*      (2006.01)
(52) U.S. Cl. .......................................... 714/36; 714/32
(58) Field of Classification Search ................. 714/32, 714/36
See application file for complete search history.

(56) References Cited

U.S. PATENT DOCUMENTS

| 6,892,323 | B2* | 5/2005 | Lin ............................. 714/36 |
| 6,931,522 | B1* | 8/2005 | Raghavan et al. ............. 713/2 |
| 2002/0147941 | A1* | 10/2002 | Gentile ........................ 714/36 |
| 2004/0078679 | A1* | 4/2004 | Cagle et al. .................. 714/36 |

* cited by examiner

*Primary Examiner*—Scott Baderman
*Assistant Examiner*—Timothy M. Bonura
(74) *Attorney, Agent, or Firm*—Cochran Freund LLC

(57) ABSTRACT

A plurality of selectable memory devices is available for booting a computer processor. The devices may be selected prior to booting, or may be changed upon recognition that the booting process is not proceeding properly. In another use, one device may be reprogrammed with an updated version while keeping the older version present. Once the updated version is functioning properly, the older version may be overwritten so that two known working copies are available.

12 Claims, 3 Drawing Sheets

300
UPDATING FLASH MEMORY

SELECTABLE AND UPDATABLE COMPUTER BOOT MEMORY

BACKGROUND OF THE INVENTION a. Field of the Invention

The present invention pertains to computer systems and specifically to computer systems that have a memory location used to boot the computer.

b. Description of the Background

Computerized devices often contain a non-volatile memory that is used by the device to begin operations. This boot memory is critical for the device to receive initial instructions so that the device may begin functioning. Often, the boot memory may have only a small set of instructions that may direct the device's processor to load other instructions into the device's volatile memory.

The non-volatile memory used for booting a computerized device may be a single point of failure for the device. If the non-volatile memory is corrupted or fails in any manner, the device may not start up correctly and thus be inoperable or dangerously unstable. Some devices may require very high reliability and may be very costly or impossible to repair if there is a failure during the boot up sequence. Remotely operated computer servers or computers onboard a satellite may be such examples. In other cases, a failure of a computerized device may be a mere inconvenience and may give a consumer a poor impression of the quality of the device.

There may be reason for updating the firmware that resides in the non-volatile memory from time to time. In some situations, it may be customary to provide periodically updated software and may further become necessary to update the boot firmware to operate properly with the updated software. Current systems do not provide a convenient way to update the boot firmware.

It may therefore be advantageous to provide a system and method for providing a fault tolerant bootable memory device. It may be further advantageous to provide a system and method for reliably updating a bootable memory device.

SUMMARY OF THE INVENTION

The present invention overcomes the disadvantages and limitations of the prior art by providing a system and method for redundant bootable memory. The redundant bootable memory may be embodied as at least two independent memory devices with a mechanism to switch between the devices, or may be embodied as a single memory device with sufficient storage capacity for at least two copies of a bootable firmware program.

A pair of bootable memory locations may be configured such that one location or the other location may be selected for booting a computer processor. The locations may be configured as discrete devices or may be portions of a larger non-volatile memory device. In the event of a known failure of one of the locations, a latch may be set to use the second location for booting. When both locations are assumed operational and a problem with booting on one location is detected, the latch may be toggled and the processor may be restarted using the second location.

For the purposes of updating the bootable program, a new revision of the bootable program may be written into the second device while keeping a known operable copy in the first device. After the operation of the firmware in the second device is verified, the first device may be overwritten so that two known good copies may be present.

The present invention may therefore comprise a method for booting a computer processor comprising: selecting a first non-volatile memory location for reading a first set of boot commands; reading the first set of boot commands from the first non-volatile memory location; attempting to execute the first set of boot commands; determining that the first set of boot commands does not function properly; selecting a second non-volatile memory location for reading a second set of boot commands; restarting the computer processor; reading the second set of boot commands from the second non-volatile memory location; and executing the second set of boot commands to boot the computer processor.

The present invention may further comprise a method of updating non-volatile memory containing boot commands for a computer processor comprising: starting the computer processor using a first set of boot commands stored in a first non-volatile memory location; selecting a second non-volatile memory location for receiving a second set of boot commands being an updated set of boot commands; writing the second set of boot commands to the second non-volatile memory location; changing a selecting indicator to cause the second non-volatile memory location to be read when the computer processor is restarted; restarting the computer processor; reading the second set of boot commands from the second non-volatile memory location; determining that the second set of boot commands functions properly; selecting the first non-volatile memory location for receiving the second set of boot commands; and writing the second set of boot commands to the first non-volatile memory location.

The present invention may further comprise a computer processor with redundant boot memory locations comprising: a first non-volatile memory location for storing a first set of boot commands; a second non-volatile memory location for storing a second set of boot commands; a selection mechanism capable of indicating a location for retrieving boot commands; and a boot sequencer capable of reading the selection mechanism and retrieving the specific set of boot commands as indicated by the selection mechanism and executing the specific set of boot commands to boot the computer processor.

The advantages of the present invention are that the bootable non-volatile memory device is not a single point of failure for a processor. In the event of a failure with the bootable memory, a backup is available to ensure that the processor may function. Further, the present invention may allow updating of the bootable memory in a safe manner, since a known good copy of the bootable memory is always available in the event of a problem with an updated copy.

DETAILED DESCRIPTION OF THE INVENTION

Figure 1:
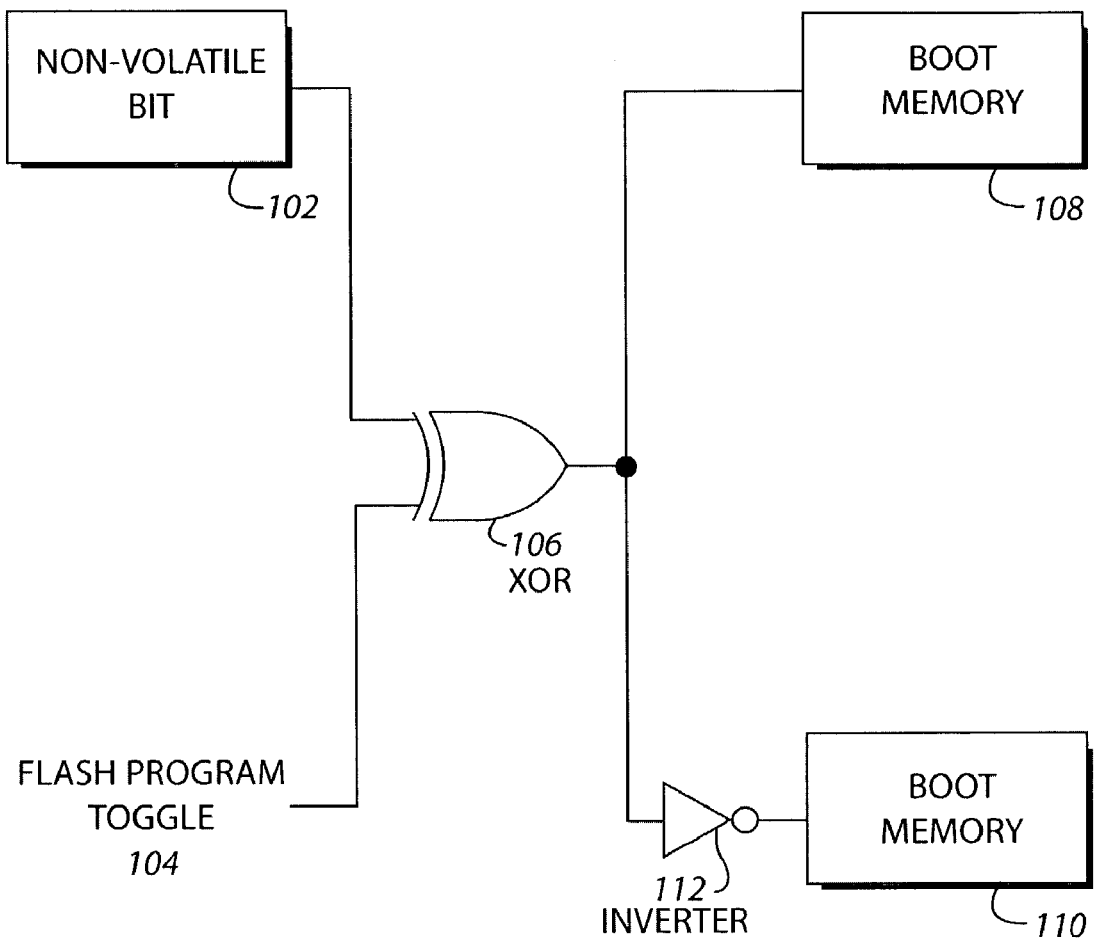
FIG. 1 is an illustration of an embodiment of the present invention of a selectable boot flash for a computer processor.

FIG. 1 illustrates an embodiment 100 of the present invention of a selectable boot flash for a computer processor.

A non-volatile bit 102 is combined with the flash program toggle bit 104 with XOR 106. The signal to is connected directly to boot memory 108 and is inverted to boot memory 110 with inverter 112.

The non-volatile bit 102 may cause either flash 108 or 110 to be active at one time. For example, when the computer processor executes a boot sequence, the non-volatile bit 102 may indicate that either boot memory 108 or 110 is to be read for the boot commands. If a problem is detected during a boot sequence, the non-volatile bit 102 may be toggled and the other flash may be read for boot commands.

Such an embodiment may be useful for increasing the fault tolerance and reliability of a computer device. In a typical computer device, the memory in which the boot commands are stored may be a single point of failure for the device. As such, if there is a problem with the memory device such as a hardware failure or corruption of the instructions, the device may not be able to successfully boot up and begin operations. By using redundant memory devices, and being able to switch between the two, the single point of failure may be eliminated.

The non-volatile bit 102 may be a bit stored in an electronically erasable programmable read only memory (EEPROM) or other computer writable non-volatile memory. In some cases, the non-volatile bit 102 may reside as a bit within an EEPROM in which one or both of the boot memories 108 or 110 are stored. In some embodiments, the non-volatile bit 102 may be a mechanical switch or other non-computer writable method of signaling. In such embodiments, the switch may be user selectable or may be activated by other mechanisms.

The non-volatile bit 102 may keep its state when the computer device is turned off and restarted. In other words, the bit 102 may be set when the computer is operational and persist during the period that the computer is turned off. Such embodiments may be useful when the computer detects a problem with the booting of the computer on one of the memories 108 or 110, toggles the bit 102, and immediately attempts to restart the computer using the opposite memory.

In some cases, the bit 102 may not persist and the state of the bit 102 may be unknown at the time of reset. In such a case, either one of the boot memories 108 and 110 may be used to attempt to boot the computer, provided that both boot memories 108 and 110 contain identical boot commands.

The boot memories 108 and 110 may be an electronically erasable programmable read only memory device (EEPROM) or may be any other kind of computer readable memory that may be used to store boot commands for a computer, such as a read only memory (ROM) or other device. In some embodiments, it may be useful to be able to erase and rewrite the memory areas while in other applications the memory location may be written only once. Those skilled in the art will appreciate that other electronic devices may be useful for storing boot commands for a computer device while keeping within the spirit and intent of the present invention.

The boot memories 108 and 110 may be two separate and discrete devices. For example, each boot memory 108 and 110 may be independent flash memory components mounted to a printed circuit board or may be another design where the memory components are physically separate and distinct. Such embodiments may be particularly suited to applications where it is desired to increase redundancy and failure tolerance.

The boot memories 108 and 110 may be two memory locations within a single memory device. Such an embodiment may be useful to avoid the added cost of an additional discrete component. In some embodiments, the boot memories 108 and 110 may be a non-volatile memory location within an integrated circuit that may contain the processor.

The flash program toggle 104 may be used to temporarily select between the two memory locations 108 and 110. By changing the state of the flash program toggle 104, the XOR gate 106 causes the input lines to the boot memory locations 108 and 110 to change state. The flash program toggle 104 may be activated to activate the memory location that was not used for booting for operations such as overwriting a new set of boot commands.

For example, if an updated set of boot commands were to be programmed into one of the boot memory locations 108 or 110, raising the flash program toggle 104 to a high state would switch the input line states to the boot memory locations 108 and 110. At that time, the updated commands may be programmed into the active boot memory location. The programming activity may be verified by reading the stored commands and comparing them to the transmitted commands. After verification, the non-volatile bit 102 may be toggled to indicate that the newly-written boot memory location is to be used for booting the computer. In this manner, if any problem should occur during the rewriting process, for example a power failure during the rewriting procedure, the computer system will still boot using the originally stored boot commands. Switching the non-volatile bit 102 may be performed after successful rewriting and verification of the newly written memory location to always allow the computer to restart without problems. During this period, there may not be a redundant copy of the boot commands when only two boot memory locations are used.

In some embodiments, more than two boot memory locations may be employed. Those skilled in the arts will appreciate that three, four, or more memory locations may be used. For example, an embodiment may have two discrete memory devices for redundancy, with each memory device having two memory locations for containing two copies of the boot instructions. In such an embodiment, the non-volatile bit 102 may contain two or more address bits and the flash program toggle 104 may further contain two or more address bits.

Figure 2:
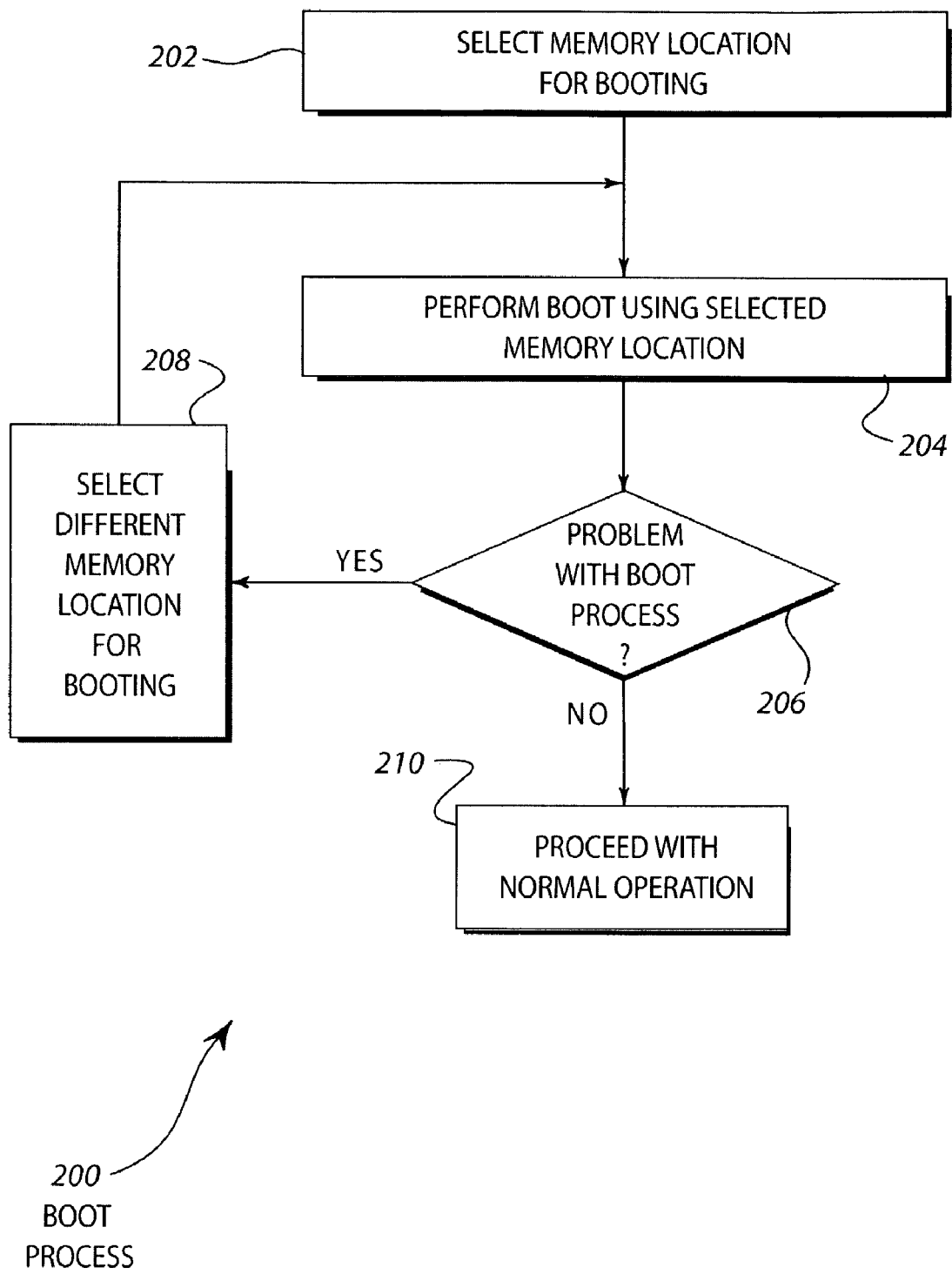
FIG. 2 is an illustration of a work flow diagram of an embodiment of a boot process wherein a second boot memory location is used when problems are detected in a first memory location.

FIG. 2 illustrates an embodiment 200 of a boot process wherein a second boot memory location is used when problems are detected in a first memory location. A first boot memory location is selected in block 202. The boot sequence is performed using the selected sequence in block 204. If a problem is detected in the boot process in block 206, a different memory location is selected in block 208 and the boot process is attempted again in block 204. If there are no problems with the boot process in block 206, normal operation is commenced in block 210.

The embodiment 200 illustrates a method by which a redundant boot memory location may allow a computer processor to successfully start up when a problem is detected during the boot process. The boot process is a critical portion of the start up sequence and if the process is not completed correctly, the computer processor may not function correctly.

The detection of a problem with the boot process in block 206 may be accomplished with many different mechanisms. For example, the boot sequence may have a self-diagnostic function that is able to determine if it is successful. In other embodiments, a watchdog timer may start simultaneously with the boot process. The watchdog timer may automatically toggle the boot memory location and perform a reset of the boot process if the watchdog timer is not disabled within a certain period of time. If the boot process is operating successfully, the boot process may stop the watchdog timer prior to the timer expiring. Those skilled in the arts may use many different mechanisms and methods to detect problems with the boot process and initiating a reset while keeping within the spirit and intent of the present invention.

Figure 3:
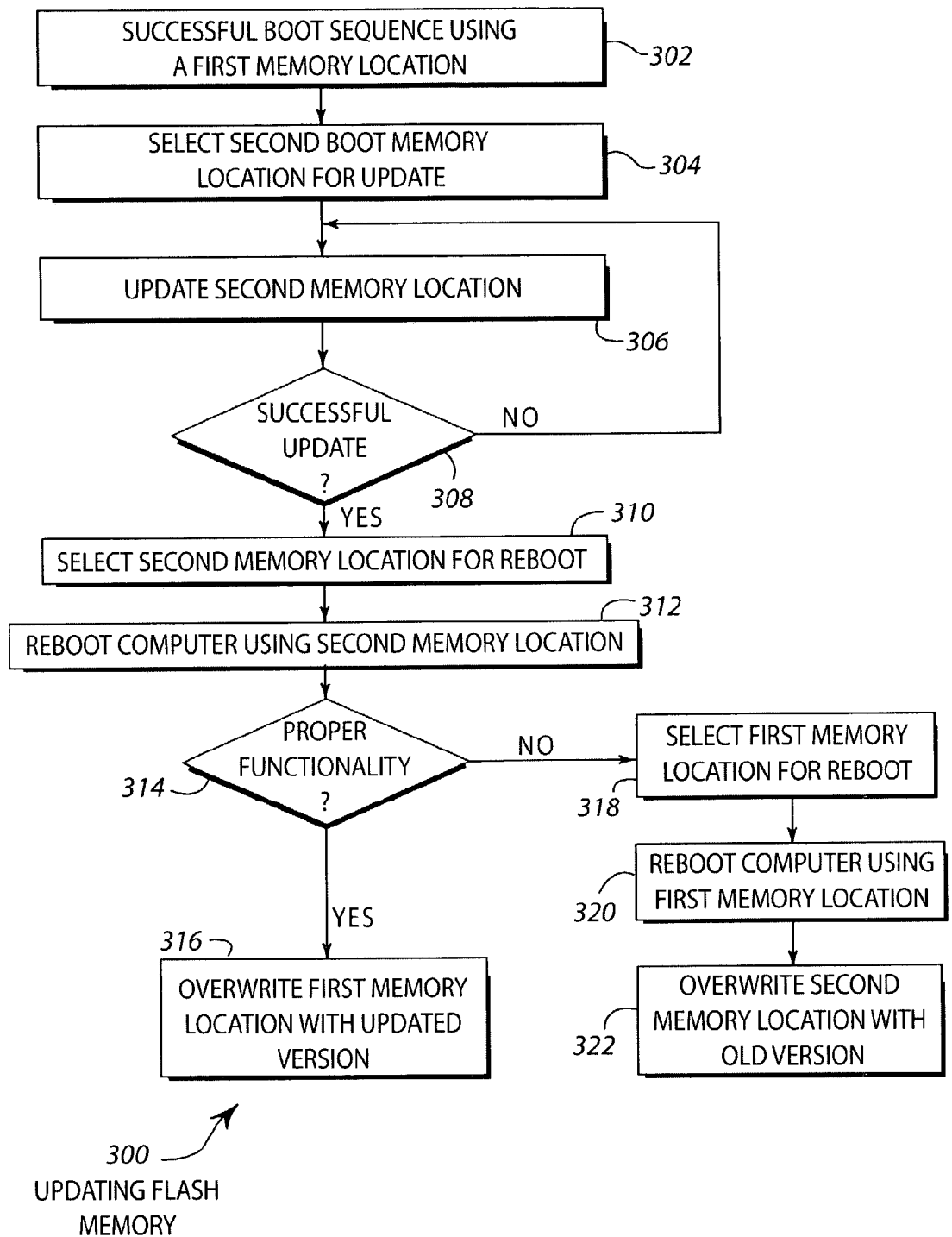
FIG. 3 is an illustration of a work flow diagram of an embodiment of a method for updating a boot memory wherein two memory locations are present.

FIG. 3 illustrates an embodiment 300 of a method for updating a boot memory wherein two memory locations are present. The computer is successfully started using the boot commands of a first memory location in block 302. A second boot memory location is selected for updating in block 304. The second memory location is updated in block 306. If the update is not successful in block 308, the memory may be rewritten in block 306. If the update is successful in block 308, the second memory location is selected for reboot in block 310 and the computer reboots using the updated commands in the second memory location in block 312. If the updated commands are functioning properly in block 314 and the first memory location is overwritten in block 316. If the updated commands are not functioning properly in block 314, the first memory location is selected in block 318 and the computer reboots using the first memory location in block 320. The second memory location is overwritten with the old version in block 322.

The embodiment 300 illustrates how the critical boot memory location may be safely updated. At least two boot memory locations may be used. The first memory location is used to successfully boot the computer. While the second memory location is being updated, the first memory location is untouched. If any problems occur during the update process, such as inadvertent power disruption or incomplete or inaccurate updating of the second memory location, the first memory location is unchanged and able to successfully restart the computer. The first memory location contains a known good set of boot commands and is known to be functioning properly, since the computer had just booted from that location.

During the period of updating the second memory location in block 306, the default pointers or selection mechanisms used to select between the first and second memory locations for boot commands is set to point to the first memory location. The pointer is not changed until block 310 after the update is verified in block 308. This ensures that the computer may restart using the first memory block during this period.

After the computer reboots using the updated commands in the second memory location in block 312, the first memory location may not be overwritten until the updated commands are verified to be functioning properly in block 314. If a problem was to occur and the updated commands caused a problem with the operation, the original boot commands may then be rewritten to the second memory location.

At the end of the process, either in block 316 or block 322, both memory locations contain the same data. If the update is successful and properly functioning, the memory locations contain the updated version. Otherwise, the memory locations contain the original working version. By having two identical copies at the end of the process, the safety of the redundant locations is restored.

In other embodiments, a second boot memory location may be written and verified with a checksum, CRC, or other method of verification. After verification, the first boot memory location may be overwritten and verified with a similar method. In such an embodiment, the device may not need to be rebooted during the update process.

In still other embodiments, two boot memory locations may be useful for allowing safe download of an updated set of boot instructions and such an embodiment may not include the watchdog timer or other routines necessary to use a second memory location in order to recover if a boot sequence fails. Such an embodiment may have the advantage that a set of updated boot instructions may be downloaded and verified and not restarted for a period of time. For example, an updated set of boot instructions may be downloaded to several devices on a network. After all of the downloads have been completed, the pointers used by the boot memory locations may be simultaneously toggled and the devices may be restarted substantially simultaneously.

The two boot memory locations may be used by some embodiments to allow the computer processor to execute one of two boot memory instructions. For example, in a case where the processor has two different functions, such as operating with two different operating systems, the pointer may be selected to point to one of the boot memory locations for one operating system and selected to point to the second boot memory location for the second operating system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for booting a computer processor comprising:
   starting said computer processor;
   selecting a first non-volatile memory location for reading a first set of boot commands;
   reading said first set of boot commands from said first non-volatile memory location;
   attempting to execute said first set of boot commands;
   determining whether said execution of said first set of boot commands is improper using a time-independent self-diagnostic function;
   selecting a second non-volatile memory location for reading a second set of boot commands if said first set of boot commands is improper;
   restarting said computer processor;
   reading said second set of boot commands from said second non-volatile memory location; and
   executing said second set of boot commands to boot said computer processor.

2. The method of claim 1 wherein said first non-volatile memory location is a first discrete component and said second non-volatile memory is a second discrete component.

3. The method of claim 1 wherein said first non-volatile memory location is a first portion of memory from a discrete memory component and said second non-volatile memory is a second portion of memory of said discrete component.

4. The method of claim 1 wherein said step of selecting a first non-volatile memory location comprises storing at least one bit in a third non-volatile memory location.

5. A method of updating non-volatile memory containing boot commands for a computer processor comprising:

starting said computer processor using a first set of boot commands stored in a first non-volatile memory location;

selecting a second non-volatile memory location for receiving a second set of boot commands only if said computer is successfully started using said first set of boot commands, said second set of boot commands being an updated set of boot commands;

writing said second set of boot commands to said second non-volatile memory location if said second non-volatile memory location is selected;

changing a selecting indicator to cause said second non-volatile memory location to be read when said computer processor is restarted subsequent to said step of writing said second set of boot commands to said second non-volatile memory location;

restarting said computer processor subsequent to said step of changing said selected indicator;

reading said second set of boot commands from said second non-volatile memory location;

determining that said second set of boot commands functions properly;

selecting said first non-volatile memory location for receiving said second set of boot commands; and writing said second set of boot commands to said first non-volatile memory location.

6. The method of claim 5 wherein said first non-volatile memory location is a first discrete component and said second non-volatile memory is a second discrete component.

7. The method of claim 5 wherein said first non-volatile memory location is a first portion of memory from a discrete memory component and said second non-volatile memory is a second portion of memory of said discrete component.

8. The method of claim 5 wherein said step of selecting a first non-volatile memory location comprises storing at least one bit in a third non-volatile memory location.

9. A computer processor with redundant boot memory locations comprising:

a first non-volatile memory location for storing a first set of boot commands;

a second non-volatile memory location for storing a second set of boot commands;

a selection mechanism capable of indicating a location for retrieving boot commands from one of said first non-volatile memory location and said second non-volatile memory location; and a boot sequencer capable of reading said selection mechanism and retrieving one of said first set and second set of boot commands as located in the specific non-volatile memory location as indicated by said selection mechanism and executing said specific set of boot commands to boot said computer processor, wherein said computer processor further comprises a processor capable of starting using said first set of boot commands stored in said first non-volatile memory location; selecting said second non-volatile memory location for receiving an updated set of boot commands; writing said updated set of boot commands to said second non-volatile memory location; changing said selection mechanism to cause said second non-volatile memory location to be read when said computer processor is restarted; restarting said computer processor; reading said updated set of boot commands from said second non-volatile memory location; determining that said updated set of boot commands functions properly; selecting said first non-volatile memory location for receiving said updated set of boot commands; and writing said updated set of boot commands to said first non-volatile memory location.

10. The computer processor of claim 9 wherein said first non-volatile memory location is a first discrete component and said second non-volatile memory is a second discrete component.

11. The computer processor of claim 9 wherein said first non-volatile memory location is a first portion of memory from a discrete memory component and said second non-volatile memory is a second portion of memory of said discrete component.

12. The computer processor of claim 9 wherein said selection mechanism comprises storing at least one bit in a third non-volatile memory location.

* * * * *